US010899068B1

(12) United States Patent
Tan et al.

(10) Patent No.: US 10,899,068 B1
(45) Date of Patent: Jan. 26, 2021

(54) METHOD OF FABRICATING SHAPE MEMORY FILMS

(71) Applicant: Government of the United States, as represented by the Secretary of the Air Force, Wright-Patterson AFB, OH (US)

(72) Inventors: Loon-Seng Tan, Centerville, OH (US); David Huabin Wang, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 74 days.

(21) Appl. No.: 16/259,055

(22) Filed: Jan. 28, 2019

Related U.S. Application Data

(63) Continuation of application No. 15/009,356, filed on Jan. 28, 2016, now Pat. No. 10,239,254.

(60) Provisional application No. 62/202,293, filed on Aug. 7, 2015.

(51) Int. Cl.
| | | |
|---|---|---|
| C08G 73/10 | (2006.01) | |
| B29C 61/00 | (2006.01) | |
| B29C 41/00 | (2006.01) | |
| B29C 41/46 | (2006.01) | |
| B29C 69/00 | (2006.01) | |
| C08J 5/00 | (2006.01) | |
| B29K 79/00 | (2006.01) | |

(52) U.S. Cl.
CPC .......... *B29C 61/003* (2013.01); *B29C 41/003* (2013.01); *B29C 41/46* (2013.01); *B29C 69/00* (2013.01); *C08G 73/1071* (2013.01); *C08J 5/00* (2013.01); *B29K 2079/08* (2013.01); *B29K 2995/0037* (2013.01); *C08J 2379/08* (2013.01)

(58) Field of Classification Search
CPC ...... A61B 2017/00867; C08L 2201/01; G03B 2205/0076; C08G 73/10; B29C 69/00; C08J 5/00
See application file for complete search history.

(56) References Cited

U.S. PATENT DOCUMENTS

| | | |
|---|---|---|
| 3,455,879 A | 7/1967 | Gay et al. |
| 3,514,415 A | 5/1970 | Karol |
| 3,600,361 A | 8/1971 | Heacock et al. |
| 3,732,200 A | 5/1973 | Bach |
| 3,763,211 A | 10/1973 | Heath et al. |
| 3,835,120 A | 9/1974 | Bach et al. |
| 3,925,312 A | 12/1975 | Fletcher |
| 3,988,374 A | 10/1976 | Brode et al. |
| 4,107,125 A | 8/1978 | Lovejoy |
| 4,111,906 A | 9/1978 | Jones et al. |
| 4,203,922 A | 5/1980 | Jones et al. |
| 4,271,288 A | 6/1981 | Woo |
| RE30,922 E | 5/1982 | Heilman et al. |
| 4,394,499 A | 7/1983 | Robinson et al. |
| 4,535,101 A | 8/1985 | Lee et al. |
| 4,728,697 A | 3/1988 | Bolon et al. |
| 4,797,466 A | 1/1989 | Oikawa et al. |
| 4,981,497 A | 1/1991 | Hayes |
| 5,101,005 A | 3/1992 | Vora et al. |
| 5,101,037 A | 3/1992 | McGrath et al. |
| 5,175,234 A | 12/1992 | Lubowitz et al. |
| 5,205,894 A | 4/1993 | Ohta et al. |
| 5,237,045 A | 8/1993 | Burchill et al. |
| 5,278,276 A | 1/1994 | Ohta et al. |
| 5,300,559 A | 4/1994 | Sheehan et al. |
| 5,344,894 A | 9/1994 | Lubowitz et al. |
| 5,411,765 A | 5/1995 | Kanakarajan et al. |
| 5,508,377 A | 4/1996 | Yamashita et al. |
| 5,516,876 A | 5/1996 | Lubowitz et al. |
| 5,585,217 A | 12/1996 | Oba |
| 5,599,582 A | 2/1997 | Adamopoulous et al. |
| 5,610,265 A | 3/1997 | Tan et al. |
| 5,631,377 A | 5/1997 | Matsuo et al. |
| 5,670,651 A | 9/1997 | Tan et al. |

(Continued)

FOREIGN PATENT DOCUMENTS

| | | | |
|---|---|---|---|
| CN | 103980491 | * | 8/2014 |
| EP | 233069 | | 8/1987 |

(Continued)

OTHER PUBLICATIONS

Schneier et al "Feasibility demonstration for electroplating ultra-thin polyimide film", Rinal report for JPL contract 954771, published on Aug. 1978.*
USPTO structure seach, Jul. 2020.*
Pyun, Eumi, et al., "Kinetics and mechanisms of thermal imidization of a polyamic acid studied by ultraviolet-visible spectroscopy", Macromolecules (1989), 22(3), 1174-83.
Sakamoto, Kenji, et al., "Highly Polarized Polymer-Based Light Emitting Diodes Fabricated by Using Very Thin Photoaligned Polyimide Layers," Journal of Applied Physics 107, 113108 (2010).
Sakamoto, Kenji, et al., "Light Exposure Dependence of Molecular Orientation of Glassy Polyfluorene Layers Formed on Photo-Aligned Polyimide Films," Colloids and Surfaces B: Biointerfaces 56, pp. 260-264 (2007).

(Continued)

*Primary Examiner* — Gregory Listvoyb
(74) *Attorney, Agent, or Firm* — AFMLCO/JAZ; James F. McBride

(57) ABSTRACT

A method for fabricating a shape memory polymer into a three-dimensional object is provided. The method includes forming a film of crosslinked poly(amic acid) on a substrate to provide a laminated substrate; forming the laminated substrate into a first configuration that is in a three-dimensional form; curing the cross-linked poly(amic acid) to provide the shape memory polymer having a permanent shape corresponding to the first configuration; and removing the substrate from the laminated substrate to provide the three-dimensional object comprising the shape memory polymer. The formation of the laminated substrate into the three-dimensional object may be based on origami techniques.

18 Claims, 5 Drawing Sheets

(56) References Cited

U.S. PATENT DOCUMENTS

| | | | |
|---|---|---|---|
| 5,705,574 A | 1/1998 | Lubowitz et al. | |
| 5,710,241 A | 1/1998 | Haubs et al. | |
| 5,864,002 A | 1/1999 | Stephens et al. | |
| 5,891,581 A | 4/1999 | Simpson et al. | |
| 5,965,687 A | 10/1999 | Jensen | |
| 6,001,277 A | 12/1999 | Ichimura et al. | |
| 6,184,333 B1 | 2/2001 | Gray | |
| 6,262,223 B1 | 7/2001 | Meador et al. | |
| 6,307,008 B1 | 10/2001 | Lee et al. | |
| 6,379,809 B1 | 4/2002 | Simpson et al. | |
| 6,509,094 B1 | 1/2003 | Shah et al. | |
| 7,402,264 B2 | 7/2008 | Ounaies et al. | |
| 7,507,472 B2 | 3/2009 | Ounaies et al. | |
| 7,527,751 B2 | 5/2009 | Ounaies et al. | |
| 7,582,722 B1 | 9/2009 | Tan et al. | |
| 7,588,699 B2 | 9/2009 | Park et al. | |
| 7,678,873 B1 | 3/2010 | Tan et al. | |
| 7,906,043 B2 | 3/2011 | Connell et al. | |
| 7,935,414 B2 | 5/2011 | Ounaies et al. | |
| 7,972,536 B2 | 7/2011 | Connell et al. | |
| 8,034,893 B2 | 10/2011 | Akiba et al. | |
| 8,173,763 B1 | 5/2012 | Tan et al. | |
| 8,314,203 B2 | 11/2012 | Tsutsumi et al. | |
| 8,389,619 B1 | 3/2013 | Tan et al. | |
| 8,546,614 B1 * | 10/2013 | Tan | C08G 73/1085 564/305 |
| 8,633,284 B2 | 1/2014 | Ronk et al. | |
| 8,785,589 B1 | 7/2014 | Tan et al. | |
| 8,791,227 B1 | 7/2014 | Tan et al. | |
| 10,239,254 B1 * | 3/2019 | Tan | B29C 69/00 |
| 2003/0064235 A1 | 4/2003 | Okawa et al. | |
| 2004/0233377 A1 | 11/2004 | Utsumi et al. | |
| 2005/0080229 A1 | 4/2005 | Deets et al. | |
| 2006/0057377 A1 | 3/2006 | Harrison et al. | |
| 2006/0217482 A1 | 9/2006 | Lukehart et al. | |
| 2006/0235194 A1 | 10/2006 | Kato | |
| 2006/0270825 A1 | 11/2006 | Angermeier et al. | |
| 2007/0106056 A1 | 5/2007 | Itatani | |
| 2007/0270562 A1 | 11/2007 | Yamada et al. | |
| 2007/0272124 A1 | 11/2007 | Tsutsumi et al. | |
| 2008/0025905 A1 | 1/2008 | Wang et al. | |
| 2008/0311303 A1 | 12/2008 | Naiki et al. | |
| 2009/0220722 A1 | 9/2009 | Wang | |
| 2010/0048745 A1 | 2/2010 | Yamada et al. | |
| 2011/0009513 A1 | 1/2011 | Chaudhary et al. | |
| 2011/0136061 A1 | 6/2011 | Itatani | |
| 2016/0369055 A1 * | 12/2016 | Leng | C08G 73/101 |

FOREIGN PATENT DOCUMENTS

| | | |
|---|---|---|
| EP | 333406 | 9/1989 |
| EP | 0529162 | 3/1993 |
| EP | 659802 | 6/1995 |
| EP | 397023 | 1/2009 |
| EP | 2380867 | 10/2011 |
| GB | 1147856 | 12/1967 |
| JP | 2005023151 | 1/2005 |
| JP | 2005154643 | 6/2005 |
| WO | 2007086487 | 2/2007 |
| WO | 2009013376 | 1/2009 |

OTHER PUBLICATIONS

Serak, S.V., et al., "Azobenzene liquid crystal polymer-based membrane and cantilever optical systems," Optics Express, vol. 17, No. 18 (Aug. 31, 2009), 15736-15746.

Si, J., et al., "Thermosetting enhancement of the light-induced polar orientation stability of molecules in polymers," J. Appl. Phys. 85, 8018 (1999); doi: 10.1063/1.370637.

Sroog, C.E., "Polyimides," Prog. Polym. Sci. 1991, 16, 561-694.

SRS Technologies and Mantech Materials, "Polyimides: CP1 and CP2 Film Properties," printed Jul. 9, 2012, 1 page, available at <http://www.mantechmaterials.com/_images/documents/3_8_doc.pdf>.

St. Clair, Anne K., et al. "Synthesis and Characterization of Essentially Colorless Polyimide Films," J. Polym. Mater. Sci Eng., vol. 51, pp. 62-66 (1984).

Straub, Daniel, "Lewis Structures of Boron Compounds Involving Multiple Bonding," J. Chem. Ed. 72(6) 494-497 (1995).

Tabiryan, N., et al., "Polymer film with optically controlled form and actuation," T. Optics Express 2005, 13, 7442-7448.

Usami K. et al., "Improvement in photo-alignment efficiency of azobenzene-containing polyimide films," Thin Solid Films 2009, 518, 729-734.

Usami, K., et al., "Stability of Photo-Induced Alignment of Azobenzene-Containing Polyimides," Molecular Crystals and Liquid Crystals (2005) 438:1, 227/[1791]-236[1800].

Usami, Kiyoaki, et al., "Photo-Aligned Blend Films of Azobenzene-Containing Polyimides with and without Side-Chains for Inducing Inclined Alignment of Liquid Crystal Molecules," Journal of Applied Physics (2011), 110(4), 043522/1-043522/6.

Usami, Kiyoaki, et al., "Pretilt Angle Control of Liquid Crystal Molecules by Photoaligned Films of Azobenzene-Containing Polyimide with Different Content of Side-Chain," Journal of Applied Phyics 104, 113528 (2008).

Van Oosten, C.L., et al., "Bending Dynamics and Directionality Reversal in Liquid Crystal Network Photoactuators," Macromolecules 2008,41,8592-8596.

Van Oosten, C.L., et al., "Glassy photomechanical liquid-crystal network actuators for microscale devices," Eur. Phys. J. E, 2007, 23, 329-336.

Viswanathan, N.K., et al., "Surface relief structures on azo polymer films," J. Mater. Chem. 1999, 9, 1941-1955.

Wang, D.H., et al., "Nanocomposites Derived from a Low-Color Aromatic Polyimide (CP2) and Amine-Functionalized Vapor-Grown Carbon Nanofibers: In Situ Polymerization and Characterization," Macromolecules 2007, 40, 6100-6111.

Wang, David H., et al., "Photomechanical Response of Glassy Azobenzene Polyimide Networks" Macromolecules 2011, 44, pp. 3840-3846.

White, T.J., et al., "A high frequency photodriven polymer oscillator," J. Soft Matter 2008,4, 1796-1798.

White, T.J., et al., "Polarization-controlled, photodriven bending in monodomain liquid crystal elastomer cantilevers," J. Mater. Chem. 2009, 19, 1080-1085.

Xie, Tao, "Recent advances in shape memory polymer," Polymer (2011), 52(22), 4985-5000.

Yager, K. G., et al., "Azobenzene Polymers as Photomechanical and Multifunctional Smart Materials," Intelligent Materials, Shahinpoor, M. and Schneider, H.-J., Eds., Royal Society of Chemistry: Cambridge, UK, 2008; pp. 424-446.

Yu, Y., et al., "Effect of Cross-linking Density on Photoinduced Bending Behavior of Oriented Liquid-Crystalline Network Films Containing Azobenzene," Chem. Mater. 2004, 16, 1637-1643.

Yu, Y., et al., "Photomechanical Effects of Ferroelectric Liquid-Crystalline Elastomers Containing Azobenzene Chromophores," Angew. Chem., Int. Ed. 2007, 46, 881-883.

Yu, Y., et al., "Precisely Direction-Controllable Bending of Cross-Linked Liquid-Crystalline Polymer Films by Light," Mol. Cryst. Liq. Cryst., vol. 436, pp. 281/[1235]-290/[1244], 2005.

Zhang, Chaohui, et al., "Rapid bending of a nonliquid crystal azobenzene polymer film and characteristics of surface relief grating" Journal of Applied Polymer Science (2009), 113(2), 1330-1334.

Tan, Loon-Seng, et al., U.S. Appl. No. 13/546,439, filed Jul. 11, 2012.

Tan, Loon-Seng, et al., U.S. Appl. No. 13/557,326, filed Jul. 25, 2012.

Tan, Loon-Seng, et al., U.S. Appl. No. 13/661,194, filed Oct. 26, 2012.

Tan, Loon-Seng, et al., U.S. Appl. No. 13/866,524, filed Apr. 19, 2013.

Tan, Loon-Seng, et al., U.S. Appl. No. 13/866,823, filed Apr. 19, 2013.

Machine Translation of JP 2005023151.

(56) References Cited

OTHER PUBLICATIONS

Machine Translation of JP 2005154643.
Machine translation of WO 2009013376.
Shukla, H.M., et al. "Azo Group Containing Bis Ligand and its Coordination Polymers," Chem. Sci. Trans. 2013, 2(1), 301-307.
Felton, Samuel M.; Tolley, Michael T.; Shin, ByungHyun; Onal, Cagdas D.; Demaine, Erik D.; Rus, Daniela; and Wood, Robert J.; "Self-Folding with Shape Memory Composites." Soft Matter 9, No. 32 (2013): 7688.
Machine Translation of JP 2005154643, 26 pages total.
United States Patent and Trademark Office, Restriction Requirement in U.S. Appl. No. 15/009,360, dated Jun. 22, 2017, 9 pages total.
United States Patent and Trademark Office, Non-Final Office Action in U.S. Appl. No. 15/009,360, dated Nov. 13, 2017, 8 pages total.
United States Patent and Trademark Office, Final Office Action in U.S. Appl. No. 15/009,360, dated Mar. 12, 2018, 10 pages total.
United States Patent and Trademark Office, Final Office Action in U.S. Appl. No. 15/009,360, dated Dec. 7, 2018, 6 pages total.
United States Patent and Trademark Office, Non-Final Office Action in U.S. Appl. No. 15/009,360, dated Aug. 24, 2018, 5 pages total.
United States Patent and Trademark Office, Advisory Action in U.S. Appl. No. 15/009,360, dated Jan. 15, 2019, 4 pages total.
United States Patent and Trademark Office, Restriction Requirement in U.S. Appl. No. 15/009,356, dated Dec. 15, 2017, 6 pages total.
United States Patent and Trademark Office, Non-Final Office Action in U.S. Appl. No. 15/009,356, dated Apr. 30, 2018, 40 pages total.
United States Patent and Trademark Office, Notice of Allowance in U.S. Appl. No. 15/009,356, dated Nov. 28, 2018, 9 pages total.
Agolini, F., et al., "Synthesis and Properties of Azoaromatic Polymers," Macromolecules (May-Jun. 1970), vol. 3, No. 3, 349-351.
Amaranatha Reddy et al., "Occurrence of the B7 mesophase in two homologous series of seven-ring achiral compounds composed of banana-shaped molecules," Liq. Cryst., vol. 30 (2003) 273-283.
Arlen, M., et al., "Thermal-Electrical Character of in Situ Synthesized Polyimide-Grafted Carbon Nanofiber Composites," Macromolecules 2008, 41, 8053-8062.
Barrett, C.J., et al., "Photo-mechanical effects in azobenzene-containing soft materials," Soft Matter 2007, 3, 1249-1261.
Behl, Marc, et al., "Shape-memory polymers" Materials Today (Oxford, United Kingdom) (2007), 10(4), 20-28.
Cain, J. C., "Para- and Meta-nitrosoacetanilide," J. Chem. Soc., Trans. 1908, 93, 681-684.
Chao, Tsung-Yi, et al., "Nonlinear Optical Polyimide/Montmorillonite/Nanocomposites Consisting of Azobenzene Dyes," Dyes and Pigments, 77 (2008) 515-524.
Chen, J.P., et al., "Highly Stable Optically Induced Birefringence and Holographic Surface Gratings on a New Azocarbazole-Based Polyimide," Macromolecules 1999, 32, 8572-8579.
Cojocariu, C., et al., "Light-induced motions in azobenzene-containing polymers," Pure Appl. Chem. 2004, 76, 1479-1497.
Eisenbach, C. D., "Relation between Photochromism of Chromophores and Free Volume Theory in Bulk Polyers," Ber. Bunsenges. Phys. Chem. 1980, 84, 680.
Eisenbach, C.D., "Isomerization of aromatic azo chromophores in poly(ethyl acrylate) networks and photomechanical effect," Polymer 1980, 21, 1175-1179.
Fay, Catherine C. et al., "Molecularly Oriented Polymeric Thin Films for Space Applications," High Performance Polymers, vol. 11, 145-156 (1999).
Finkelmann, H., et al., "A New Opto-Mechanical Effect in Solids," Phys. Rev. Lett. 2001, 87, 01550111-01550114.
Georgiev, A., et al, "Polyimide Coatings Containing Azo-Chromophores as Structural Units," Journal of Physics, Conference Series vol. 113 No. 1 (2008) 012032.
Gonzalo et al., "Synthesis, Characterization, and Thermal Properties of Piezoelectric Polyimides," J. Polym. Sci. Part A: Polym. Chem., vol. 47 (2009) 722-730.

Harris, K.D., et al., Large amplitude light-induced motion in high elastic modulus polymer actuators, J. Mater. Chem. 2005, 15, 5043-5048.
He, Guang S., et al., "Degenerate Two-Photon-Absorption Spectral Studies of Highly Two-Photon Active Organic Chromophores," J. Chem. Phys., vol. 120 No. 11 (2004) 5275-5284.
Hergenrother, P.M., "Recent Developments in High Temperature Organic Polymers," Polyimides and Other High-Temperature Polymers, Abadie, M.J.M. and Sillion, B., Eds., Elsevier: New York, 1991, pp. 1-18.
Hogan, P.M., et al., "UV-Manipulation of Order and Macroscopic Shape in Nematic Elastomers," Phys. Rev. E: Stat., Nonlinear, Soft Matter Phys. 2002, 65, 041720/1-041720110.
Hosono, Nobuhiko, et al., "Photochemical control of network structure in gels and photo-induced changes in their viscoelastic properties" Colloids and Surfaces, B: Biointerfaces (2007), 56(1-2), 285-289.
Hrozhyk, Uladzimir, et al., "Bidirectional Photoresponse of Surface Pretreated Azobenzene Liquid Crystal Polymer Networks," Optics Express, vol. 17, Issue 2, pp. 716-722 (2009).
Hugel, Thorsten, et al., "Single-molecule optomechanical cycle", Science (2002), 296(5570), 1103-1106.
Irie, M, et al., "Photoresponsive Polymers," Functional Monomers and Polymers, 2nd ed., Takemoto, K., et al., Eds., Dekker: New York, 1997, pp. 65-116.
Irie, M., "Photochromism and Molecular Mechanical Devices," Bull. Chem. Soc. Jpn. 2008, 81 (8), 917-926.
Jacobs et al., "Dielectric characteristics of polyimide CP2," Polym., vol. 51 (2010) 3139-3146.
Japanese Patent Office, Machine Translation of JP 2005154643A, 39 pages.
Jenekhe, Samson A., et al., Nonlinear Optical Properties of Poly(p-phenylenebenzobisoxazole), Chem. Mater. 1992, 4, 683-687.
Kannan, Ramamurthi, et al., Diphenylaminofluorene-Based Two-Photon Absorbing Chromophores with Various π-Electron Acceptors, Chem. Mater. 2001, 13, 1896-1904.
Kannan, Ramamurthi, et al., "Toward Highly Active Two-Photon Absorbing Liquids: Synthesis and Characterization of 1,3,5-Triazine-Based Octupolar Molecules," Chem. Mater. 2004, 16, 185-194.
Koerner, H., et al., "Photogenerating work from polymers," Mater. Today (Oxford, U. K.) 2008, 11, (7-8), 34-42.
Koerner, Koerner, et al., "Polymer design for high temperature shape memory: Low crosslink density polyimides," Polymer (2013), 54, 391-402.
Kondo, M., et al., "Effect of concentration of photoactive chromophores on photomechanical properties of crosslinked azobenzene liquid-crystalline polymers," J. Mater. Chem. 2010, 20, 117-122.
Koshiba, Y., et al., "Photo-induced alignment behavior of azobenzene compound in thin film," Thin Solid Films 2009, 518, 805-809.
Kumar, G.S., et al., "Photochemistry of Azobenzene-Containing Polymers," Chem. Rev. 1989, 89, 1915-25.
Lee et al., "Enhancement of photogenerated mechanical force in azobenzene-functionalized polyimides," Angew. Chem., vol. 124 (2012) 4193-4197.
Lee, K.M., et al., "Relationship between the Photomechanical Response and the Thermomechanical Properties of Azobenzene Liquid Crystalline Polymer Networks," Macromolecules 2010, 43, 8185-8190.
Lee, Kyung Min, and White, Timothy J., "Photomechanical Response of Composite Structures Built from Azobenzene Liquid Crystal Polymer Networks," Polymers (2011), 3, 1447-1457.
Lendlein Andreas et al., "Shape-Memory Polymers," Angewandte Chemie, International Edition, vol. 41, 2034-2057 (2002).
Li, M.-H., et al., "Light-Driven Side-On Nematic Elastomer Actuactors," Adv. Mater. 2003, 15, 569-572.
Liu C. et al., "Review of Progress in Shape-Memory Polymers," Journal of Materials Chemistry, vol. 17, 1543-1558 (2007).
Lovrien, R., "The Photoviscosity Effect," Proc. Natl. Acad. Sci. U.S.A. 1967 (57) 236-242.
Makita, Shohei, et al., "Synthesis of Alkaline-Developable, Photosensitive Hyperbranched Polyimides through the Reaction of Carboxylic Acid Dianhydrides and Trisamines," Journal of Polymer Science Part A: Polymer Chemistry, vol. 42, 3697-3707 (2004).

(56) References Cited

OTHER PUBLICATIONS

Mathisen, R., et al., "Imidization studies of polyamic acids by dye-labeling technique," Polymer Preprints (American Chemical Society, Division of Polymer Chemistry) (1987), 28(1), 82-83.

Meador, Mary Ann B., et al., "Improvements to the Synthesis of Polyimide Aerogels," ACS Spring National Meeting 2011, Anaheim, CA; Mar. 20-26, 2011, 34 pages.

Meador, Mary Ann B., et al., "Synthesis and Properties of Nanoporous Polyimide Aerogels Having a Covalently Bonded Network Structure," Polymer Preprints 2010, 51(1), 265.

Miner, Gilda A., et al., "The Wettability of LaRC Colorless Polyimide Resins on Casting Surfaces," J. Polym. Mater. Sci Eng., vol. 76, pp. 381-382 (1997).

Natansohn, A., et al., "Photoinduced Motions in Azo-Containing Polymers," Chemical Reviews (Washington, DC, United States) (2002), 102(11), 4139-4175.

Park, B., et al., "Thermal and Optical Stabilities of Photoisomerizable Polyimide Layers for Nematic Liquid Crystal Alignments," Jpn. J. Appl. Phys. vol. 37 (1998) pp. 5663-5668.

Park, C., et al., "Actuating Single Wall Carbon Nanotube-Polymer Composites: Intrinsic Unimorphs," Adv. Mater. 2008, 20, 2074-2079.

Pieroni, O., et al., "Photoresponsive Polymeric Materials," Trends Polym. Sci. (Cambridge, U.K.) 1995, 3, 282-287.

\* cited by examiner

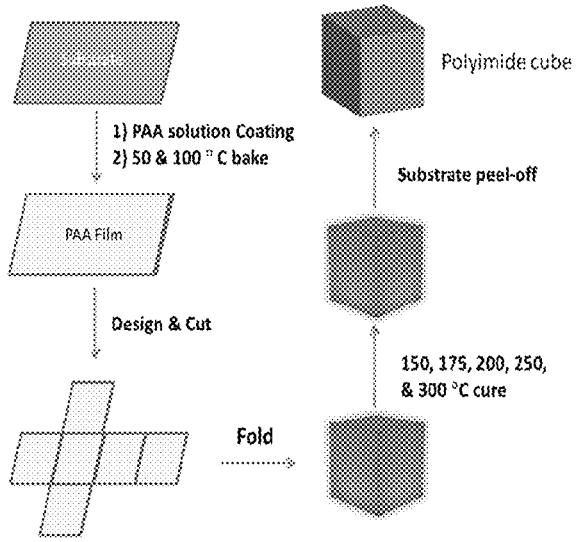
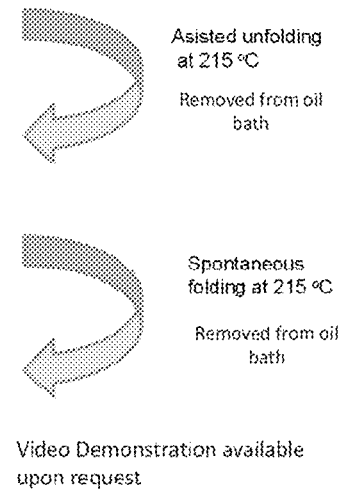
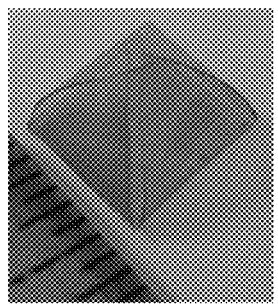
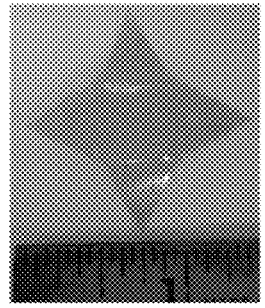
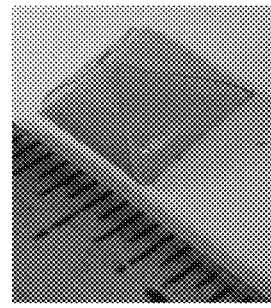
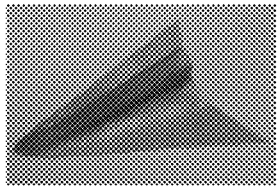
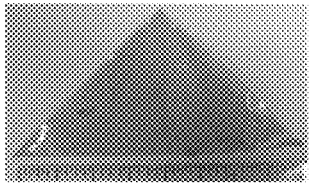
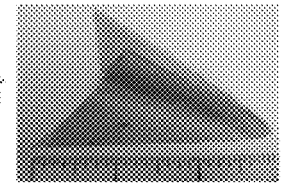
FIGS. 2A–2D

5A

5B

METHOD OF FABRICATING SHAPE MEMORY FILMS

CROSS-REFERENCE TO RELATED APPLICATIONS

The present application claims priority to U.S. patent application Ser. No. 15/009,356, filed on Jan. 28, 2016, which in turn claims priority to U.S. Provisional Patent Application Ser. No. 62/202,293, which was filed on Aug. 7, 2015, and is incorporated herein by reference in its entirety. This application is also related to co-pending U.S. patent application Ser. No. 15/009,360, filed on even date herewith, by inventor Loon-Seng Tan, et al., and entitled "MULTI-FUNCTIONAL CROSSLINKING AGENT, CROSS-LINKED POLYMER, AND METHOD OF MAKING SAME," which is incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The invention generally relates to methods of making films that possess shape memory properties at elevated temperatures, and more particularly to methods of fabricating crosslinked polyimide or poly(amide-imide) polymer films that have shape memory properties.

BACKGROUND OF THE INVENTION

Shape memory polymers (SMPs) are a class of active materials that can be programmed to "fix" a temporary shape or a series of temporary shapes, and then later to recover to a "memorized" permanent shape established by a covalent or physical network by applying thermal, electrical, or other environmental stimulus. In the case of thermal stimulation, the shape memory polymers are characterized by deforming at a temperature above a softening transition such as glass transition temperature ($T_g$) and melting point ($T_m$) of the polymer, then cooling through this transition under stress, causing immobilization of the constituent network chains, and the macroscopic shape to be fixed. Recovery of the permanent shape is then accomplished by heating above the triggering temperature, which re-mobilizes the network chains and allows rubber (entropic) elasticity to return the sample to its equilibrium shape. Depending on the nature of external stimulus, SMPs are categorized as the thermally-induced SMPs, light-induced SMPs, electro-active SMPs, pH-responsive SMPs, and water/moisture-driven SMPs, and various mechanisms are operating in each category. Shape-memory materials, which include shape-memory alloys (SMAs), have been widely used in actuation, aircraft, robotics, piping, medical and dental applications. It is noted that SMPs differ from SMAs in that their glass transition or melting transition from a hard to a soft phase, which is responsible for driving the shape memory effect, whereas for SMAs, martensitic/austenitic transitions are responsible for the shape memory effect.

There are numerous advantages that make SMPs more attractive than SMAs. For example, SMPs have much higher capacities for elastic deformation (up to 200% in most cases), much lower cost, lower density, a broader range of application temperatures which can be tailored, comparatively easy processing, and potential biocompatibility and biodegradability. However, the state-of-the art SMPs are consisted of high-alkyl content polymers such as, polyurethane, poly(ε-caprolactone), poly(norbornene), (ethylene-oxide)/(ethylene terephthalate)-based copolymers, styrene/butadiene copolymers, thiol-ene/acrylate copolymers, etc. Therefore, none of the foregoing has shape-memory properties temperatures above 150° C. or long-term thermal and thermo-oxidative stabilities in this temperature region. Accordingly, for extremely hot environment applications, current state-of-the art shape-memory materials lack key properties that enable high-temperature patterning/processing, and sustaining performance, dimensional stability.

In recent years, a number of high-temperature shape-memory polymers have appeared in open and patent literature. For example, aromatic polyimides, polyamides, and poly(amide-imide)s are common classes of heat-resistant, thermally stable, polymers with glass transition temperatures in excess of 150° C. Recent work has revealed that crosslinking these polymers with certain crosslinking agents (e.g., tri- and tetra-amines and tri- and tetra-anhydrides) can impart shape-memory effects. For example, multi-functional amine crosslinking agents have been described in U.S. Pat. Nos. 8,546,614; 8,791,227; and 8,962,890, and multi-functional anhydride crosslinking agents are described in U.S. Provisional Patent Application entitled MULTIFUNCTIONAL CROSSLINKING AGENT, CROSSLINKED POLYMER, AND METHOD OF MAKING SAME, filed on even date herewith. Each of the foregoing U.S. patent documents is incorporated herein by reference in its entirety.

Despite the foregoing, there are few described methods for fabricating these heat-resistant, thermally stable SMPs into useable objects. Accordingly, there is a need for new methods of fabricating objects from SMPs.

SUMMARY OF THE INVENTION

In accordance with embodiments of the present invention, a method for fabricating a shape memory polymer into a three-dimensional object is provided. The method includes a) forming a solution comprising a poly(amic acid) intermediate, wherein the solution comprises a solvent, and a reaction product of an aromatic diamine monomer and a di-anhydride-containing monomer; b) treating the solution comprising the poly(amic acid) intermediate with a multi-functional crosslinking agent to thereby form a sol-gel comprising a crosslinked poly(amic acid); c) forming a film of crosslinked poly(amic acid) on a substrate to provide a laminated substrate; d) forming the laminated substrate into a first configuration that is in a three-dimensional form; e) curing the cross-linked poly(amic acid) to provide the shape memory polymer having a permanent shape corresponding to the first configuration, wherein the shape memory polymer comprises a crosslinked polyimide or a crosslinked poly(amide-imide); and f) removing the substrate from the laminated substrate to provide the three-dimensional object comprising the shape memory polymer.

In accordance with another embodiment, the method further includes g) heating the three-dimensional object to a first temperature that is above a triggering temperature; h) deforming the three-dimensional object to a second configuration that is different from the first configuration; and i) lowering the three-dimensional object to a second temperature that is below the triggering temperature while the three-dimensional object is maintained in the second configuration.

In yet another embodiment, the method further includes j) heating the three-dimensional object in the second configuration to a third temperature that is above the triggering temperature to thereby induce the self-rearrangement of the three dimensional object from the second configuration to the first configuration.

In yet another embodiment, the multi-functional crosslinking agent utilized in the method is a multi-functional anhydride crosslinking agent, and the poly(amic acid) intermediate is an amine-terminated poly(amic acid) intermediate obtained by reacting a stoichiometric excess of the aromatic diamine monomer with the di-anhydride-containing monomer. Complementary to the foregoing and in yet another embodiment, the multi-functional crosslinking agent utilized in the method is a multi-functional amine crosslinking agent, and the poly(amic acid) intermediate is an anhydride-terminated poly(amic acid) intermediate obtained by reacting a stoichiometric excess of the di-anhydride-containing monomer with the aromatic diamine monomer.

Additional objects, advantages, and novel features of the invention will be set forth in part in the description and drawings which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with the summary given above, and the detailed description given below, serve to explain the invention.

FIG. 2A illustrates a flow chart for the construction of a six-sided box via poly(amic acid)/crosslinking/polyimide processing chemistry, in accordance with another embodiment of the invention;

FIG. 2B illustrates the high temperature shape memory effect of the crosslinked polyimide film shaped into a cube, in accordance with another embodiment of the invention;

FIG. 2C illustrates the high temperature shape memory effect of the crosslinked polyimide film shaped into a square-based pyramid, in accordance with another embodiment of the invention;

FIG. 2D illustrates the high temperature shape memory effect of the crosslinked polyimide film shaped into a "paper airplane," in accordance with another embodiment of the invention;

DETAILED DESCRIPTION OF THE INVENTION

Figure 1:
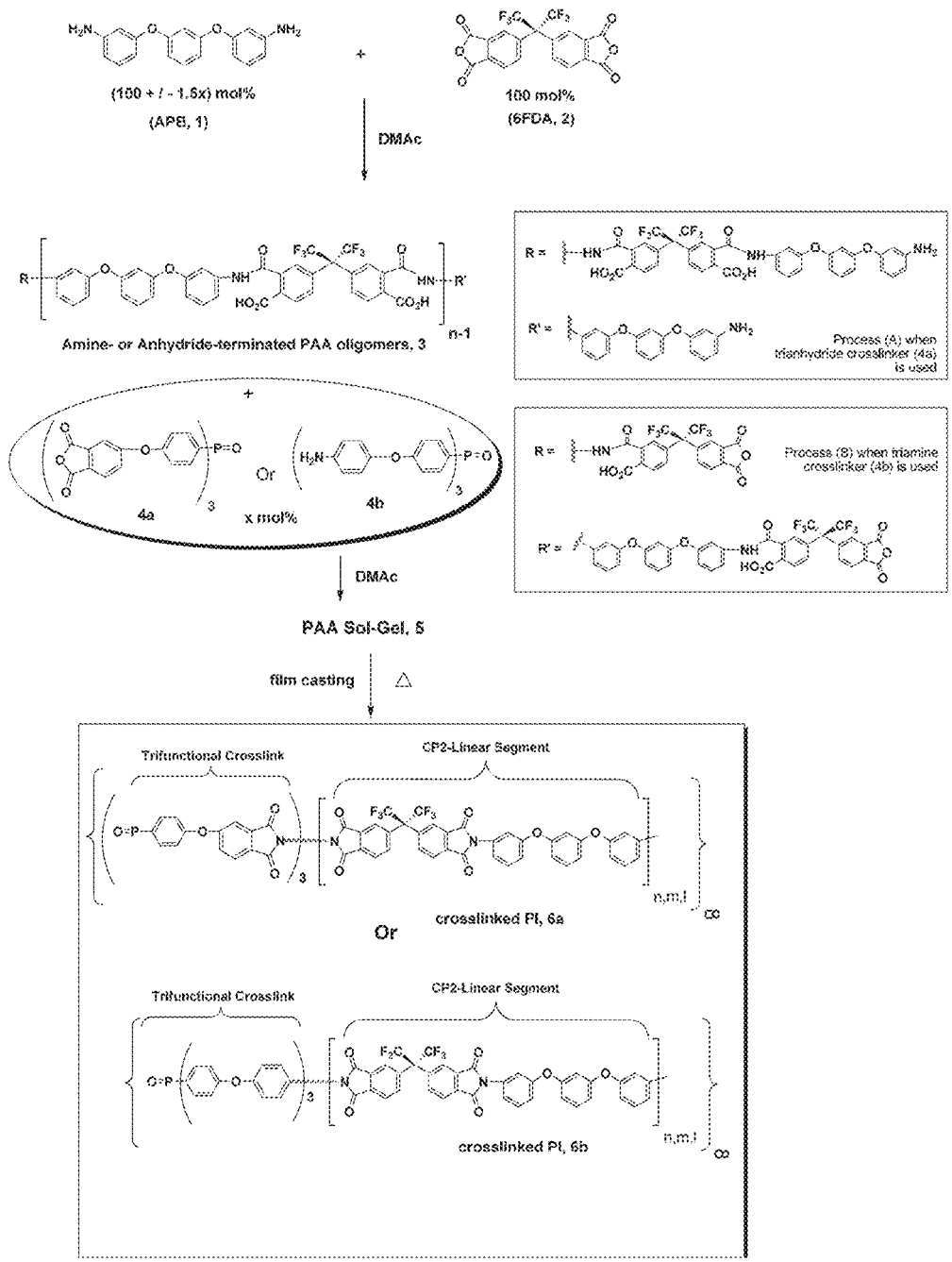
FIG. 1 illustrates processing chemistry that is used to generate a crosslinked polyimide film from its corresponding reactive polyamic acid and either a multi-anhydride or multi-amine crosslinking agent, in accordance with an embodiment of the present invention.

In accordance with embodiments of the present invention, a method for fabricating a shape memory polymer into a three-dimensional object is provided. The method includes a) forming a solution comprising a poly(amic acid) intermediate, wherein the solution comprises a solvent, and a reaction product of an aromatic diamine monomer and a di-anhydride-containing monomer; b) treating the solution comprising the poly(amic acid) with a multi-functional crosslinking agent to thereby form a sol-gel comprising a crosslinked poly(amic acid); c) forming a film of crosslinked poly(amic acid) on a substrate to provide a laminated substrate; d) forming the laminated substrate into a first configuration that is in a three-dimensional form; e) curing the cross-linked poly(amic acid) to provide the shape memory polymer having a permanent shape corresponding to the first configuration, wherein the shape memory polymer comprises a crosslinked polyimide or a crosslinked poly(amide-imide); and f) removing the substrate from the laminated substrate to provide the three-dimensional object comprising the shape memory polymer.

The method may further include g) heating the three-dimensional object to a first temperature that is above a triggering temperature; h) deforming the three-dimensional object to a second configuration that is different from the first configuration; and i) lowering the three-dimensional object to a second temperature that is below the triggering temperature while the three-dimensional object is maintained in the second configuration. Furthermore, the method may include j) heating the three-dimensional object in the second configuration to a third temperature that is above the triggering temperature to thereby induce the self-rearrangement of the three dimensional object from the second configuration to the first configuration.

According to another embodiment of the present invention, the formation of the laminated substrate may be based on origami techniques. As commonly known, origami is a Japanese art based on folding paper, but in recent years, the concept has been advanced beyond artistic creations and toys such that three-dimensional, complex objects now can be designed to be capable of on-command transformation into a wide range of devices and robotic systems. Easily taken for granted examples to illustrate the utility of origami concept can be found in foldable maps, shopping bags, storage boxes and cartons, etc. More advanced examples such as automobile airbags, shock absorbers, 3D and light-trapping photovoltaics, and biomedical devices/implants such as stent further illustrate the ingeneous application of origami engineering concept. In general, origami concept is best used to solve technological problems that require solutions to (i) small-volume packaging for (ii) efficient storage and (iii) transportation, (iv) easy deployment, and in some cases (v) reusability. The most attractive features of origami concept are (i) it is scale-free, applicable from nanoscale level (protein folding and DNA origami) to kilometer-scale (solar panels) and (ii) applicable to various printing techniques.

Fundamentally, origami can be considered as a process that involves a sequence of folding steps (i.e. programmed fold or crease pattern) to eventually transform a 2-D substrate to the designed 3-D object. Therefore, important to 2D-to-3D transformation process is shape memory effect, and naturally, a requisite characteristic of the polymer substrate for origami-inspired fabrication is to have a shape-memory capability. The notion of imparting elastomer-like shape memory effect to thermoplastic or crosslinked polymers may be based on three different mechanisms: thermal, photothermal, and photochemical mechanisms.

For extremely hot environment applications, current state-of-the art (SOA) shape-memory materials lack key properties that enable high-temperature patterning/processing, and sustaining performance, viz. dimensional stability. Accordingly, the disclosed fabrication method is based on poly (amic-acid)/polyimide chemistry to construct origami-inspired, deployable objects, which can rapidly transform from flat structures to 3D shapes at temperatures in excess of 200° C. Additionally, the flat structures that embody temporary configuration have been observed to be dimensionally stable under ambient conditions.

Crosslinked Polyimide and Poly(amide-imide) Polymers

Because of the similar polymerization chemistry to generate polyimides and poly(amide-imides), the multi-functional crosslinking agents disclosed herein may be used to crosslink these classes of polymers to create covalent network structures capable of showing shape memory effects at elevated temperatures.

Synthesis of a polyimide is typically accomplished by polymerization of a diamine and a dianhydride in a 1:1 molar ratio to generate a poly(amic acid) precursor, which is then converted to the corresponding polyimide typically by either thermal cure (e.g., by heating to >200° C. in solution or solid state) or chemical imidization using a dehydrating agent or promoter such as acetic anhydride/triethylamine or acetic anhydride/pyridine. However, to generate a polyimide having the desired amount of crosslinking, an appropriately-terminated poly(amic acid) precursor is first generated by off-setting the dianhydride:diamine ratio. For example, to provide an amine-terminated poly(amic acid) precursor, the amount of diamine is used in excess to cap both ends of the poly(amic acid) precursor. An appropriate amount of a multi-anhydride crosslinking agent is then added to the precursor solution so that all or substantially all of the terminal amine groups will be consumed. Conversely, to provide an anhydride-terminated poly(amic acid) precursor, the amount of di-anhydride-containing monomer is used in excess to cap both ends of the poly(amic acid) precursor. Then an appropriate amount of a multi-amine crosslinking agent is then added to the precursor solution so that all or substantially all of the terminal anhydride groups will be consumed. In either embodiment, crosslinked polyimides may then be created using appropriate imidization conditions.

In accordance with an aspect of the polymer, the diamine monomer comprises an aromatic diamine, which includes, but is not limited to, 1,3-bis(3-aminophenoxy)benzene (APB); 1,4-bis(3-aminophenoxy)benzene; 1,2-bis(3-aminophenoxy)benzene; 1,2-bis(4-aminophenoxy)benzene; 1,3-bis(4-aminophenoxy)benzene; 1,4-bis(4-aminophenoxy)benzene; 3,4'-oxydianiline; 4,4-oxydianiline; 1,3-diamino-4-methylbenzene; 1,3-diamino-4-(trifluoromethyl)benzene; 2,4-diaminobiphenyl; 2,2-bis(4-aminophenyl)-1,1,1,3,3,3-hexafluoropropane; 2,2-bis(4-aminophenyl)propane; 2,2-bis[4-(4-aminophenoxy)phenyl]-1,1,1,3,3,3-hexafluoropropane; 2,2-bis[4-(4-aminophenoxy)phenyl]propane; or a mixture of thereof.

In accordance with another aspect, the dianhydride monomer includes, but is not limited to 2,2-[bis(4-phthalic anhydrido)]-1,1,1,3,3,3-hexafluoroisopropane (6FDA); 4,4'-oxybis(phthalic anhydride); 3,3',4,4'-diphenylsulfone tetracarboxylic dianhydride; 3,3',4,4'-benzophenone tetracarboxylic dianhydride; 4,4'-(2,2,2-trifluoro-1-phenylethylidene)bis[phthalic anhydride]; 2,2-bis[4-(3,4-dicarboxyphenoxy)phenyl]propane dianhydride; 4,4'-(p-phenylenedioxy)bis[phthalic anhydride]; 4,4'-(m-phenylenedioxy)bis[phthalic anhydride]; 4,4'-(o-phenylenedioxy)bis[phthalic anhydride]; or mixtures thereof.

The synthesis of a poly(amide-imide) is typically accomplished by polymerization of i) a diamine and a trimellitic anhydride (TMA) or trimellitic anhydride acid chloride (TMAC); or ii) a diamine and a diimide-dicarboxylic acid monomer derived from a selective condensation of TMA and an aromatic diamine (e.g., $H_2N-Ar-NH_2$). When acid monomers are used, the polymerization process is aided by triethylphosphite/pyridine (Yamazaki-Higashi reagent) in a 1:1 molar ratio in an amide solvent such as N,N-dimethylformamide (DMF), N,N-dimethylacetamide (DMAc), N-methylpyrrolidone (NMP), etc.

Persons having ordinary skill in the art will appreciate that these polymerization methods may be applied to other dianhydride monomers containing pre-formed aromatic amide moieties. For example, bis(phthalic anhydride) monomers with preformed amide as part of the linking group, which are also known as diamide-dianhydrides (DADA), can be prepared from trimellitic anhydride acid chloride (TMAC) and an aromatic diamine (e.g., $H_2N-Ar-NH_2$) in refluxing acetone with pyridine as HCl scavenger.

However, to generate a poly(amide-imide) having the desired amount of crosslinking, an appropriately-terminated poly(amide-imide) may be first generated via Yamazaki-Higashi reaction by off-setting TMA:diamine ratio. To make the amine-terminated poly(amide-imide), the amount of diamine is in excess to cap both ends of the polymer. After the amino-terminated polyamide has been isolated by precipitation in methanol and filtration, it is washed with methanol and dried in vacuo overnight. The amino-terminated polyamide can then be dissolved or suspended in an amide solvent and mixed with an amide solution of a multi-anhydride crosslinking agent in an appropriate amount so that all or substantially all of the terminal amine groups are consumed, which is immediately followed by casting and thermal curing under reduced pressure to create crosslinked poly(amide-imide) films. Conversely, to make the anhydride-terminated poly(amide-imide), the amount of amine monomer is not used in excess and thus is the limiting reagent.

In a preferred method to generate a poly(amide-imide) having the desired amount of crosslinking, it is more suitable that an appropriately-terminated poly(amide-amic acid) is first generated via by off-setting DADA:diamine ratio so that either diamide-dianhydride or diamine is in excess. In the former case, anhydride-terminated poly(amide-amic acid) is generated, and in the latter case, amine-terminated poly(amide-amic acid). Then an appropriate amount of a multi-amine crosslinking agent or multi-anhydride crosslinking agent is then added to the respective precursor solution so that all or substantially all of the reactive terminal groups will be consumed. This is immediately followed by casting and thermal curing under reduced pressure to create crosslinked poly(amide-imide) films.

The ability to vary the amount of crosslinking allows the synthesis of crosslinked polyimides and poly(amide-imides) with mechanical properties (i.e. $T_g$) tailored to a specific application or to specific environmental conditions. A generalized method for incorporating a sufficient amount of functionalization in the poly(amic acid)-containing precursor may be based on the desired degree of crosslinking in the resultant polyimide or poly(amic acid). For example, the general method can include selecting the desired multi-functional crosslinking agent (e.g., amine- or anhydride-functionalized) and the desired amount of crosslinking (x mol %), and then preparing the appropriately functionalized poly(amic acid)-containing precursor by employing the excess monomer in an amount of about (100+1.5 x) mol %. The limiting reagent is based on 100 mol %. In one embodiment, the amount of multi-functional crosslinking agent used to crosslink the poly(amic acid) may vary from about 0.3 mol % to about 10 mol %. In another embodiment, the amount of multi-functional crosslinking agent used to crosslink the poly(amic acid) may vary from about 0.5 mol % to about 5 mol %. For example, the multi-functional crosslinking agent concentration about 0.5 mol %, about 1.0 mol %, about 2.0 mol %, or about 5.0 mol %.

Multi-Anhydride Crosslinking Agents

In accordance with an embodiment of the present invention, a multifunctional crosslinking agent is provided that has three or four anhydride functional groups (i.e., tri-anhydride crosslinking agents or tetra-anhydride crosslinking agents, respectively). The multifunctional crosslinking agents may be defined by the general chemical formula (I): (Z—Ar—)$_n$—W, wherein Z represents an anhydride functional group that is directly or indirectly bonded to Ar; wherein Ar represents an aryl group that is directly bonded to W; and wherein n is equal to 3 when W is N or P=O, or n is equal to 4 when W is Si or an sp$^3$ hybridized carbon moiety. Accordingly, the tri-anhydride crosslinking agents may be (Z—Ar)$_3$N or (Z—Ar)$_3$P=O; and the tetra-anhydride crosslinking agents may be (Z—Ar)$_4$Si or (Z—Ar)$_4$R, where R represents the carbon moiety (e.g., fluorenyl).

In accordance with an aspect of the invention, the aryl group (Ar), which is directly bonded to W through a carbon atom, may be a phenyleneoxy group (—OPh-) that is para- or meta-substituted with respect to oxygen, and thus the agent may be further defined by the general chemical formula (II): (Z—OPh-)$_n$-W. In one embodiment, the phenyleneoxy group represents that the benzene ring portion may unsubstituted (i.e., OC$_6$H$_4$); alternatively, the phenyleneoxy group may have substituents (e.g., C1-C4 alkyl groups) around the benzene ring. In one example, where W is P=O, the agent may be further defined by the general chemical formula (III): (Z—OPh-)$_3$-P=O.

In accordance with another aspect, the aryl group (Ar) may be a phenyleneoxy group (—OPh-) that is para- or meta-substituted with respect to oxygen, and Z may be a phthalic anhydride group that is connected to the phenyleneoxy group through an ether bond. Accordingly, the agent may be further defined by the general chemical formula (IV):

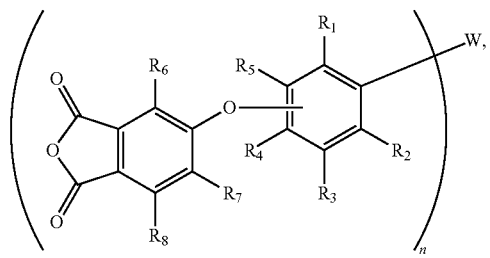

wherein W and n are as defined above, and R$^1$ through R$^8$ are independently selected from H or C1-C4 alkyl. Where W is P=O, these phosphine oxide-based crosslinking agents may be defined by the general chemical formula (V):

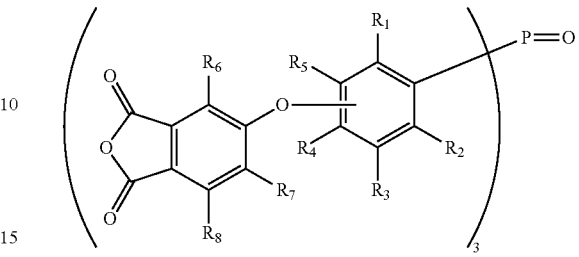

Exemplary phosphine oxide-based crosslinking agents are tris[4-(3,4-dicarboxyphenoxy)phenyl] phosphine oxide tri-anhydride (where R$^1$ to R$^3$ and R$^5$ to R$^8$ are H), and its meta-isomer, which is tris[3-(3,4-dicarboxyphenoxy)phenyl] phosphine oxide tri-anhydride (i.e., where R$^1$ to R$^4$ and R$^6$ to R$^8$ are H).

In accordance with yet another aspect, where W is N, and where the aryl group (Ar) is the phenyleneoxy group (—OPh-), which is para- or meta-substituted with respect to oxygen, a tertiary amine-based crosslinking agent may be defined by the general chemical formula (VI): (Z—OPh-)$_3$N. In another embodiment, where Z is the phthalic anhydride group that is connected to the phenyleneoxy group through an ether bond, exemplary tertiary amine-based crosslinking agents may be defined by the general chemical formula (VII):

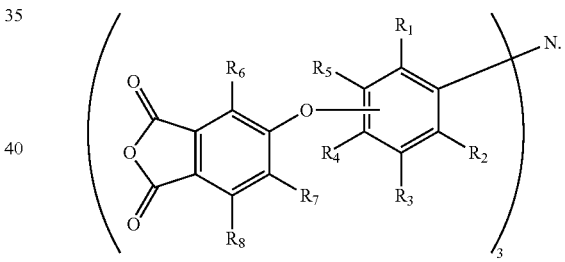

Exemplary tertiary amine-based crosslinking agents are tris[4-(3,4-dicarboxyphenoxy)phenyl]amine tri-anhydride (where R$^1$ to R$^3$ and R$^5$ to R$^8$ are H), and its meta-isomer, which is tris[3-(3,4-dicarboxyphenoxy)phenyl]amine tri-anhydride (i.e., R$^1$ to R$^4$ and R$^6$ to R$^8$ are H).

In accordance with yet another aspect where W is nitrogen (N), and where Z and Ar from Formula (I) in combination form a phthalic anhydride moiety that is directly bonded to nitrogen, this tertiary amine-based crosslinking agent may be defined by the general formula (VIII):

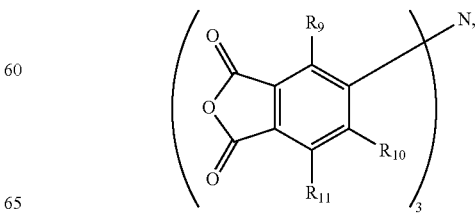

wherein $R^9$ to $R^{11}$ are independently selected from H or C1-C4 alkyl. An exemplary tertiary amine-based crosslinking agent is tris(phthalic anhydride)amine (where $R^9$ through $R^{11}$).

In accordance with another embodiment, complementary tetra-anhydride crosslinking agents include where W (in Formulas (I), (II), and (IV)) is a carbon moiety, and thus n is 4. Further, exemplary carbon-based tetra-anhydride crosslinking agents 4a, 4b, and 5c are also shown in Table 1. The carbon moiety may include a centralized $sp^3$ hybridized carbon to provide a generally tetrahedral geometry to the agent. For example, agents 4a and 4b include a fluorenyl group, where the C9 carbon of the fluorenyl group is $sp^3$ hybridized.

As also shown in Table 1, the complementary tetra-anhydride crosslinking agents include where W (in Formulas (I), (II), and (IV)) is silicon or an $sp^3$ hybridized carbon, and thus n is 4. Further, exemplary silicon-based (5a and 5b, E=Si) or $sp^3$ hybridized carbon-based (5c and 5d, E=C) tetra-anhydride crosslinking agents are also shown in Table 1.

TABLE 1

Exemplary Multi-Anhydride Crosslinking Agents

Tri-anhydride crosslinkers

1a

2a

3

TABLE 1-continued
Exemplary Multi-Anhydride Crosslinking Agents
Tetra-anhydride crosslinkers
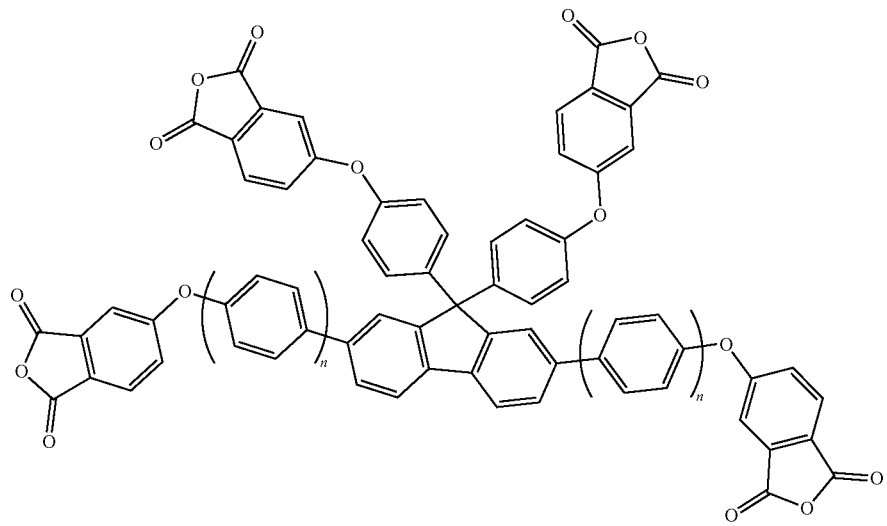
4a (n = 0)
4b (n = 1)
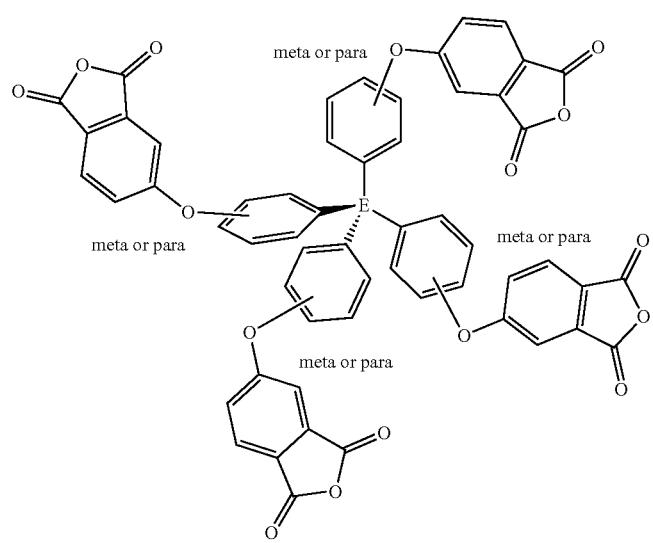
5a (E = Si; all para)
5b (E = Si; all meta)
5c (E = C; all para)

In accordance with an embodiment, the cross-linked polyimides obtained with the multi-anhydride crosslinking agents may be defined by then following general chemical formula (IX):

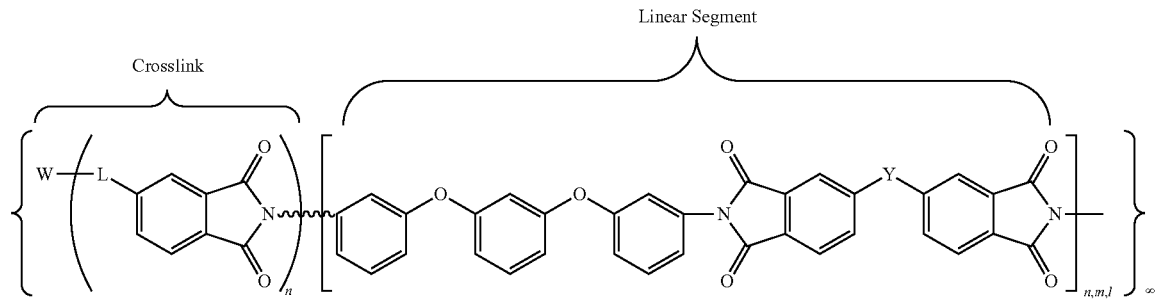

where W may be P=O, N, Si, or a carbon moiety (e.g., fluorenyl); wherein L denotes either a direct covalent bond to W or a linking group (e.g., a phenyleneoxy group) for indirect bonding to W; n,m,l denote the degree of polymerization (DP) of each branch of polyimide, which may be of the same or different values, with the DP range of about 3 to about 30. For example, in an embodiment, DP is in a range of about 5 to about 25, or about 10 to about 20. The overall network structure is denoted by the infinity symbol (∞). The linking group Y is one of the following moieties: —C(CF$_3$)$_2$—, —O—, —SO$_2$—, —C(=O)—, -(Ph)C(CF$_3$)—, —OPh-C(CF$_3$)$_2$—OPh-, —OPh-C(CH$_3$)$_2$—OPh-. In another embodiment, Y is —C(CF$_3$)$_2$.

In accordance with another embodiment, the cross-linked polyimides obtained with the multi-anhydride crosslinking agents may be defined by the following general chemical formula (X):

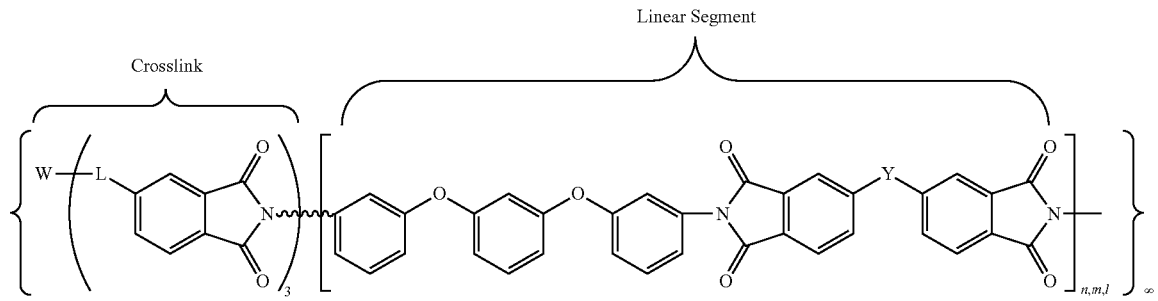

where W may be N or P=O; L, n, m, l, and Y are as defined above.

In accordance with yet another embodiment, the cross-linked polyimides obtained with the multi-anhydride cross-linking agents may be defined by the following general chemical formula (XI):

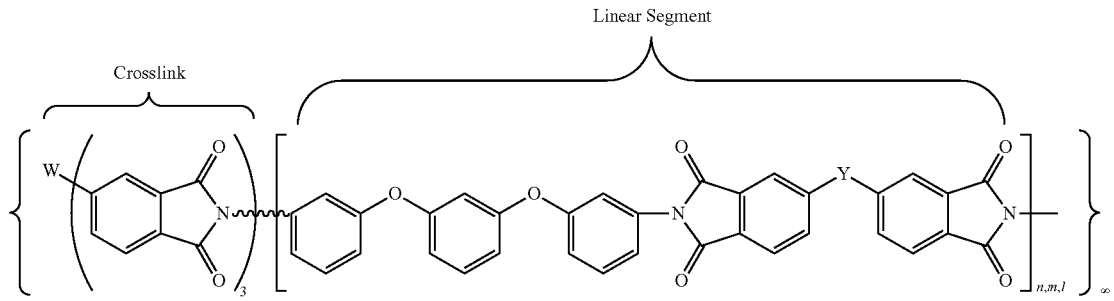

where W is N or benzene-1,3,5-trioxy (1,3,5-C$_6$H$_3$O$_3$); and n, m, l, and Y are as defined above.

Multi-Amine Crosslinking Agents:

In accordance with an embodiment of the present invention, a multifunctional crosslinking agent is provided that has three amine functional groups (i.e., tri-amine crosslinking agent). The tri-amine crosslinking agent may be defined by the general chemical formula (IX): $(H_2N—Ar—)_3—W$, wherein Ar represents an aryl group that is directly or indirectly bonded to W; and wherein W may be $CH_3C$ (methylcarbyl); N (trivalent nitrogen); P=O (phosphine oxide); or $BO_3$ (borate). Accordingly, the tri-amine crosslinking agents may be $(H_2N—Ar—)_3—CCH_3$, $(H_2N—Ar—)_3—N$, $(H_2N—Ar—)_3—P=O$, or $(H_2N—Ar—)_3—BO_3$. In an embodiment, the Ar is a biaryl ether, and thus the tri-amine crosslinking agent may be further defined by the general formula (X): $(H_2N—Ar'—O—Ar''—)_3—W$, where Ar' and Ar'' may be similarly or differently substituted, and where the various isomers are further contemplated.

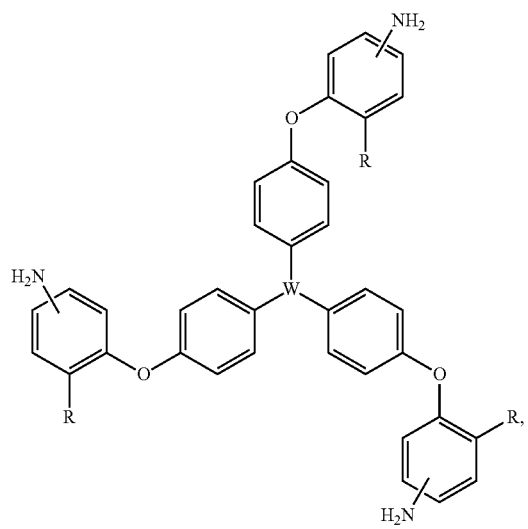

According to yet another embodiment, the tri-amine crosslinking agent is a tri(oxybenzene-amine) crosslinker having the following general formula (XII):

wherein W may be $CH_3C$ (methylcarbyl); N (trivalent nitrogen); P=O (phosphine oxide); or $BO_3$ (borate); R may be H, F, Cl, $CF_3$, or $CH_3$; and the amine groups ($—NH_2$) may be in the meta or para position with respect to oxygen of the biaryl ether bond. Exemplary tri(oxybenzene-amine) crosslinking agents 6a,b; 7a,b; 8a,b; and 9a,b are shown in Table 2.

TABLE 2

Exemplary Tri(oxybenzene-amine) Crosslinking Agents

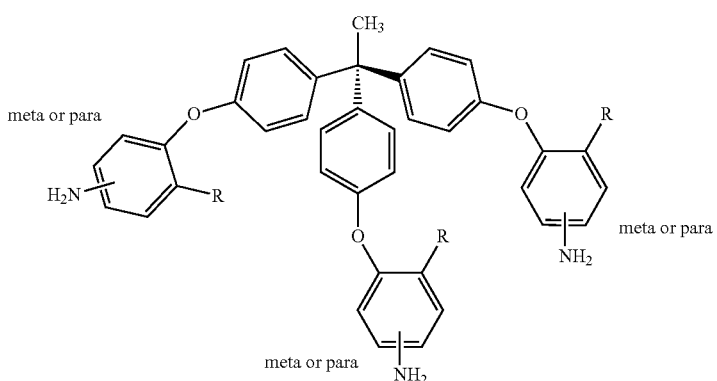

6a,b

TABLE 2-continued
Exemplary Tri(oxybenzene-amine) Crosslinking Agents
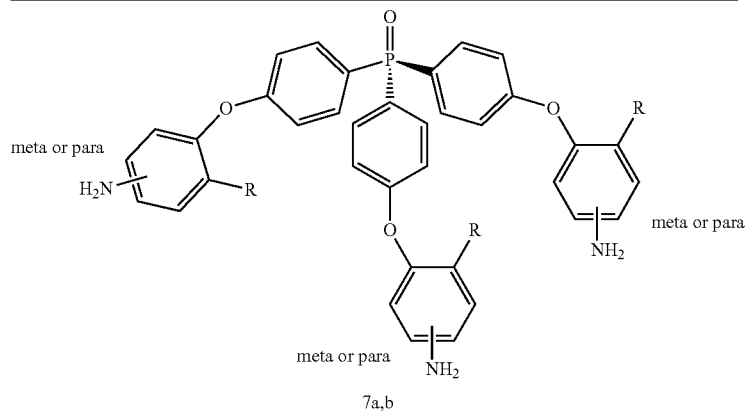
7a,b
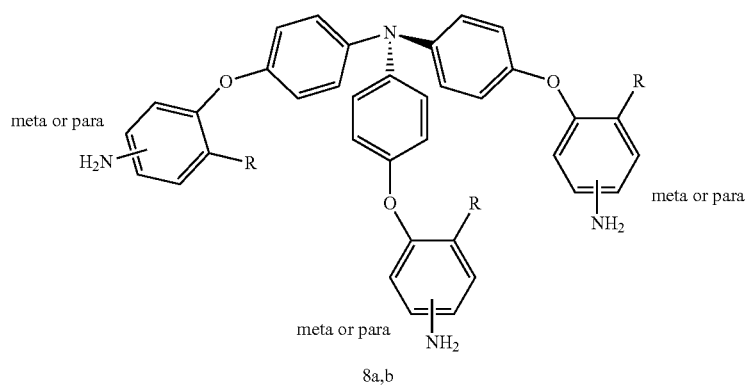
8a,b
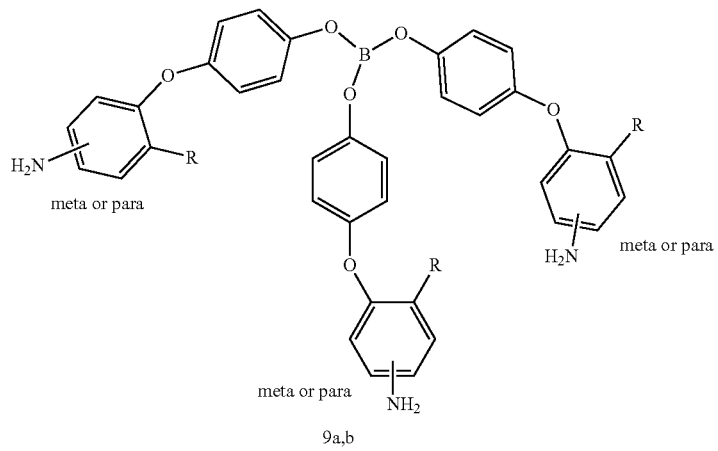
9a,b
Exemplary crosslinked aromatic polyimides obtained from the tri(oxybenzene-amine) crosslinking agents (where R=H) have the following general formula (XIII):
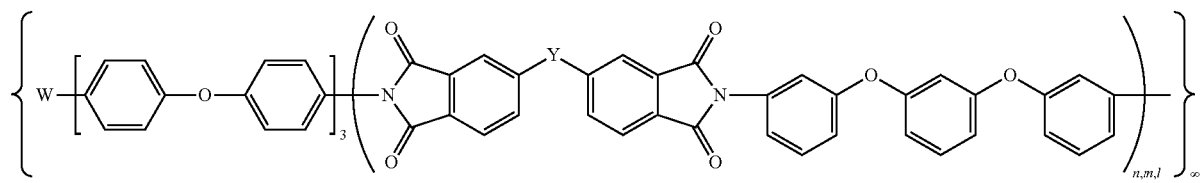

wherein Y is selected from the group consisting of —C(CF$_3$)$_2$—, —O—, —SO$_2$—, —C=O—, -(Ph)C(CF$_3$)—, —OPh-C(CH$_3$)$_2$-PhO—, —O(1,3-Ph)O— and —O(1,4-Ph)O—; n, m, and l are degrees of polymerization (DP) of each branch of the crosslinked aromatic polyimide; and the infinity symbol (∞) is used to denote an infinite network structure for a crosslinked polymer.

Similar to the crosslinked polymers obtained using the multi-anhydride crosslinking agents, the degrees of polymerization (DP) of each branch of the crosslinked aromatic polyimide may be the same or different. In one exemplary embodiment, the DPs are the same with respect to one another. In another embodiment, at least one of the DPs is different. In another embodiment, the DP of each branch may be in a range of about 3 to about 110 units. In an alternative embodiment, the DP may be in a range of about 3 to about 30, or about 5 to about 55 units. For example, in another embodiment, DP is in a range of about 5 to about 25, or about 10 to about 20.

The extent and amount of crosslinking in the crosslinked polyimide polymers and films may be altered by varying the concentration of the tri-amine crosslinker (i.e. about 0.5 mol %, about 1.0 mol %, about 2.0 mol %, or about 5.0 mol %). In one embodiment, the tri-amine crosslinker concentration may vary from about 0.3 mol % to about 10 mol %. In another embodiment, the tri-amine crosslinker concentration may be between about 0.5 mol % to about 5 mol %. The ability to vary the amount of crosslinking allows the synthesis of crosslinked polyimides with mechanical properties (i.e. T$_g$) tailored to a specific application or to specific environmental conditions.

EXAMPLES

The following examples and methods are presented as illustrative of the present invention or methods of carrying out the invention, and are not restrictive or limiting of the scope of the invention in any manner.

With reference to FIG. 1, exemplary processing chemistry that is used to generate either tri-anhydride or tri-amine crosslinked polyimide films from their respective reactive polyamic acid solution and crosslinker are provided. CP2 (LaRC™-CP2, NASA Langley Research Center) is an exemplary fluorinated polyimide derived from 2,2-bis(4-phthalic anhydrido)-1,1,1,3,3,3-hexafluoroisopropane (6FDA) and 1,3-bis(3-aminophenoxy)benzene (APB). The subject polyimide (CP2) is selected to prove the concept because it is a well-known and well-characterized polyimide derived from 2,2-bis(4-phthalic anhydrido)-1,1,1,3,3,3-hexafluoroisopropane (6-FDA, a dianhydride monomer) and 1,3-bis(3-aminophenoxy)benzene (APB, a diamine monomer). Briefly, CP2 is a high-performance aerospace-grade polyimide that possesses remarkable properties including, high mechanical toughness, solvent resistance, high glass transition temperature, ultraviolet radiation resistance, low color, low solar absorption, and high thermal and thermo-oxidative stability. CP2 is particularly suitable for long-term survivability in space environments, and has been used to develop lightweight, inflatable structures that serve as Gossamer-like spacecraft, satellites, and solar energy collection/reflection systems. Addition of high-temperature shape-memory capability to CP2 and related polyimides will extend their applications where robust, dynamic properties are required under extremely hot conditions.

Still referring to FIG. 1, the origami-inspired fabrication process is based on the processing chemistry of poly(amic acid)/polyimide using either a triphenylphosphine-based tri-anhydride (4a) or triamine (4b) as a crosslinker. In this process, when the trianhydride crosslinker (x mol %) is used (i.e. process A), the co-monomers, APB (a diamine, 1) and 6FDA (a dianhydride, 2) were dissolved under nitrogen atmosphere in a polar aprotic solvent such as N,N-dimethylacetamide (DMAc) (5 wt % polymer concentration) at room temperature for 24 h with excess APB (i.e. 1.5x mol % excess where x=mol % of trianhydride crosslinker used) for the preparation of poly(amic acid) oligomers (PAA oligomers, 3a) with reactive amine function as endgroups. Subsequently, the trianhydride crosslinker (e.g. phosphine oxide trianhydride, 4a; x mol %) was added to the solution of PAA oligomers with a reaction stoichiometric ratio of the amino group to the terminal acid anhydride. After the crosslinker had completely dissolved, the resulting PAA sol-gel (5a) was immediately used in the fabrication of origami object as described in the following paragraph. Alternatively in the process B, when a triamine crosslinker is used, anhydride-terminated PAA (3b) solution is generated from the initial polymerization mixture of excess dianhydride monomers and diamine monomer, followed by addition of stoichiometrically balanced amount of the triamine crosslinker to result in the modified PAA sol-gel (5b) for immediate used in the fabrication of an origami object.

Referring to FIG. 2A, a flow chart for constructing a hollow shape memory polyimide cube is provided. The first step of the fabrication is to prepare the modified PAA solution (sol-gel) containing the requisite amount of an appropriate crosslinker as described above and shown in FIG. 1. The second step entails pouring the viscous PAA sol-gel into a substrate (e.g. an aluminum dish). The third step pertains to evaporation of the solvent under reduced pressure and in temperature range where none or partial curing of PAA is taking place. For example, the substrate coated with the viscous modified PAA solution may be heated to a temperature from about 50° C. to about 100° C. under reduced pressure, such that only partial curing of PAA is taking place. However use of lower temperatures (e.g., room temperature to about 50° C.) and lower pressures (e.g., less than about 200 torr or less than about 100 torr) may minimize or prevent excessive curing. Once the laminated substrate is stable, the next step involves drawing the origami folding pattern on the aluminum side of the substrate and cut out the pattern with a pair of scissors. Manual folding sequence of the two-dimensional configuration of the origami object at room temperature is then performed so that the aluminum substrate is on the outside to form a three-dimensional form.

Following an imidization process, where a curing schedule for crosslinked polyimides is performed (e.g., sequential heating at about 150° C., about 175° C., about 200° C., about 250° C., and/or about 300° C.), the next step involves removal of the substrate. For example aluminum can be dissolved easily in aqueous HCl. The resulting crosslinked polyimide hollow cube is shown in the top photo of FIG. 2B.

Still referring to FIG. 2B, this crosslinked polyimide cube can be unfolded manually into the corresponding planar "cross" structure in an oil bath at about 215° C. Stable indefinitely at room temperature, the temporary "cross" structure spontaneously (approximately less than about 20 seconds) folds into the cube upon immersion in (by dropping into) the same hot oil bath. The PI cube showed no visible shape distortion after 3 days at 215° C., and regained its initial modulus (~3 GPa by dynamic mechanical analysis) after taken out of the oil bath. As depicted in FIGS. 2C and 2D, two more origami objects have been similarly fabricated, namely a square-based pyramid (C) and a "paper plane" using the following crosslinked polyimides, PAm-CP2-5 and PAn-CP2-1, respectively to demonstrate generality of the process. Pam-CP2-5 contains 5 mol % of reacted triamine crosslinker and Pan-CP2-1, 1 mol % of reacted trianhydride crosslinker.

Figure 3:
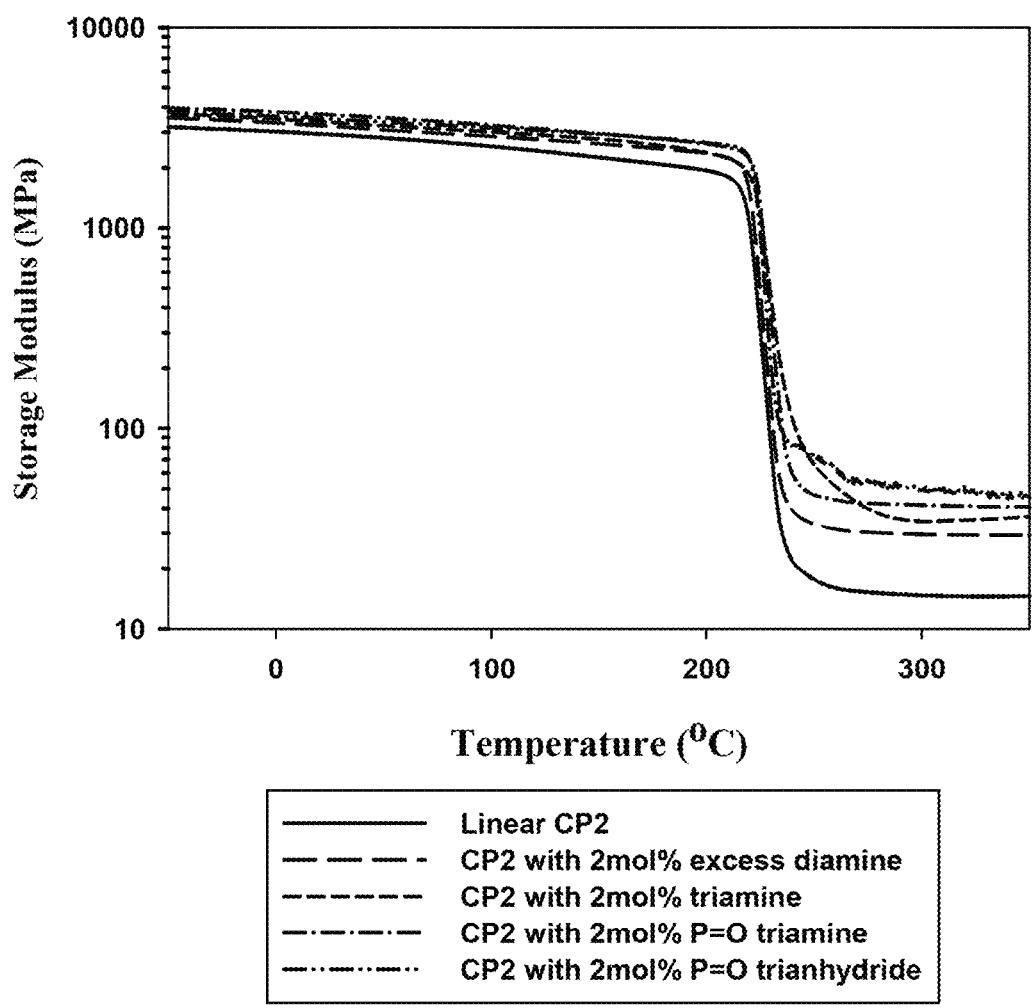
FIG. 3 is a plot of Storage Modulus (MPa) versus Temperature (° C.) for a linear polyimide and various crosslinked polyimides demonstrating relative dimensional stability of the glass-transition plateau.

Additionally, as shown in FIG. 3, dynamic mechanical analysis of linear CP2 and various crosslinked CP2 films was used to compare their moduli and relative dimensional stability on the glass-transition plateau, which shows the dramatic increase in storage modulus imparted by crosslinking with the multi-functional crosslinking agents.

Figure 4:
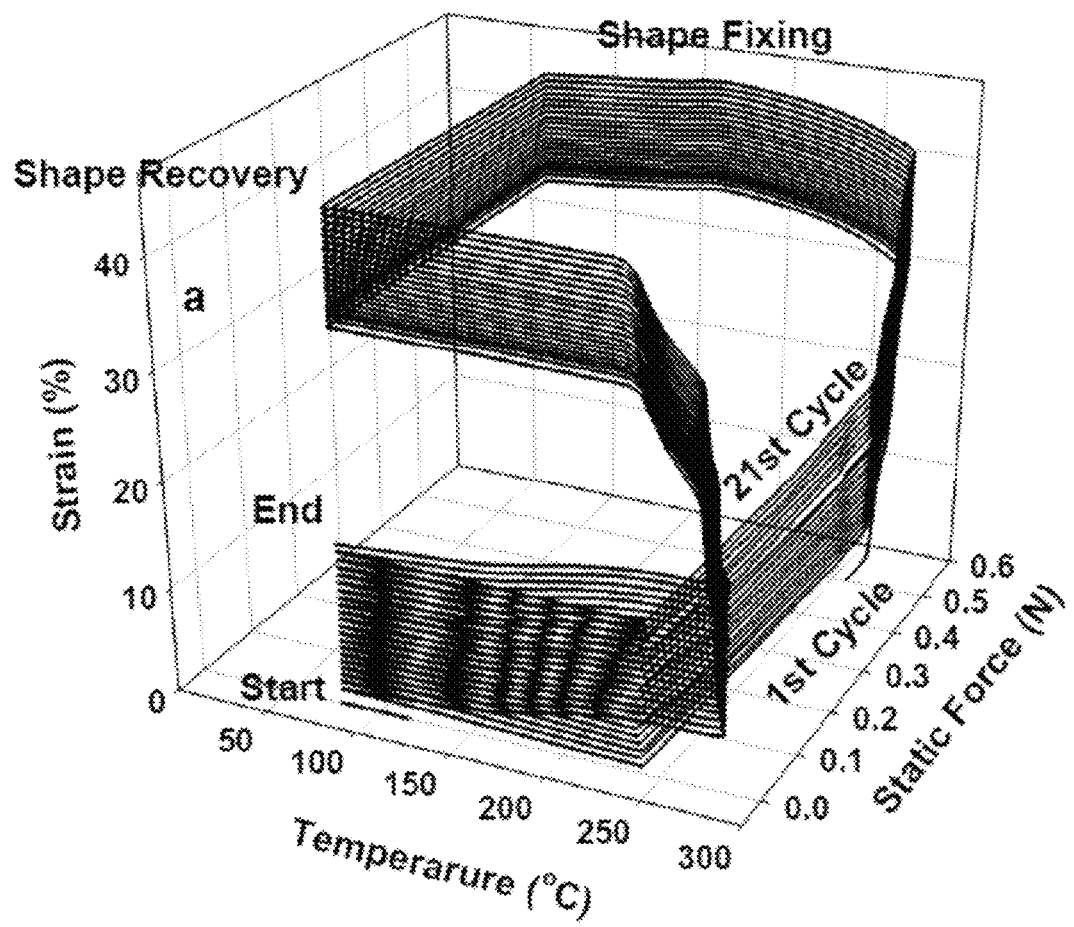
FIG. 4 is a three dimensional plot of Strain (%) versus Static Force (N) versus Temperature (° C.) showing a data from a shape memory stress-strain-temperature demonstration, which was processed in accordance with an embodiment of the present invention.
Figure 5A:
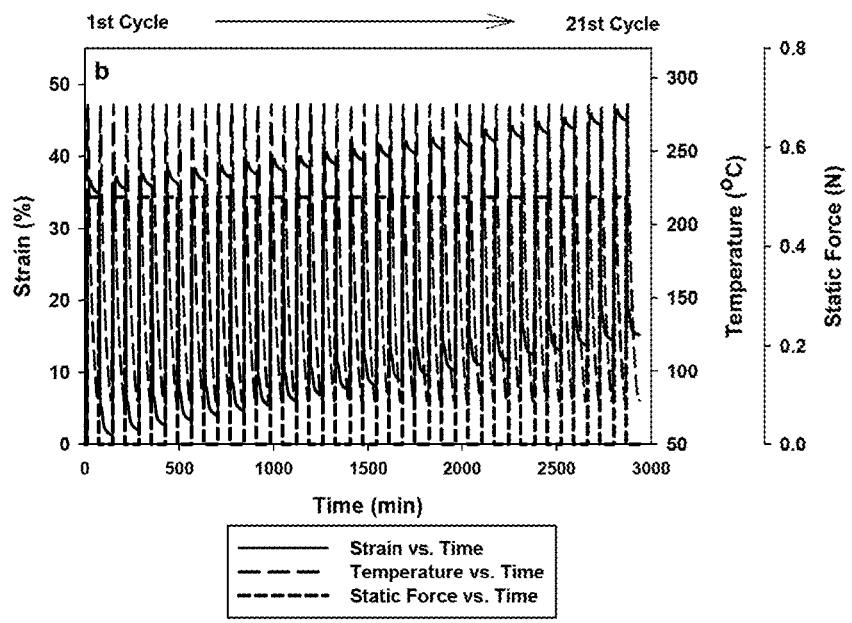
FIGS. 5A and 5B are two-dimensional plots of Strain (%), Static Force (N), and Temperature (° C.) versus time showing data from 1 cycle to 21 cycles (5A) and 1 cycle to 5 cycles (5B) from a demonstration of change of strain, stress, with temperature and time using a sample film of PAn-CP2-5, which was processed in accordance with an embodiment of the present invention
Figure 5B:
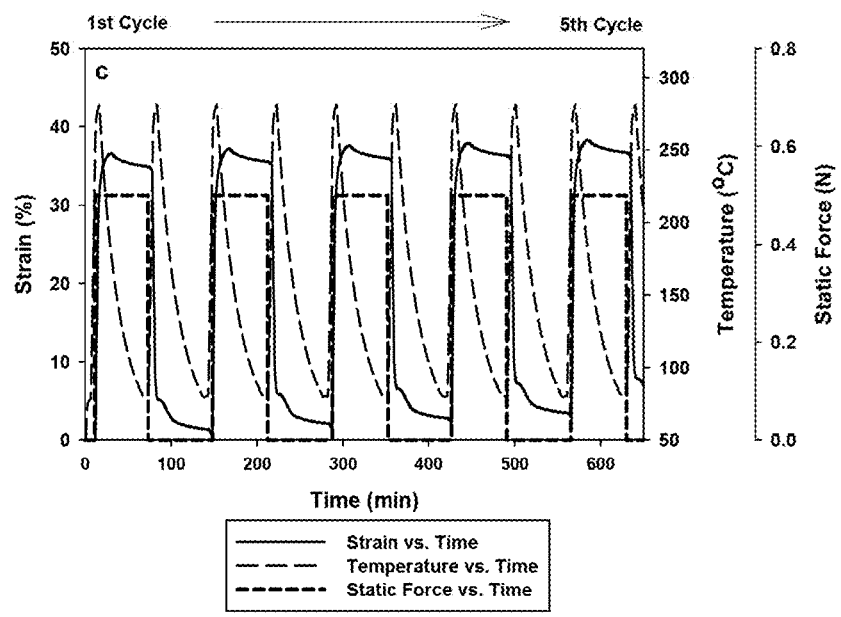

Repeatability of the shape recovery process was determined via cyclic DMA recovery experiments at constant heating/cooling rates. A force was applied at 280° C. that allowed the sample to stretch to 35% strain at which point the sample was equilibrated at 280° C. The sample was then cooled to 80° C., the stress released and then heated to recover the shape at 280° C. FIG. 4 shows both the three-dimensional and two-dimensional shape memory behaviors of the 5 mol % crosslinked polyimide (PAn-CP2-5), where the glass transition temperature was used as the triggering temperature. Both shape memory fixity and recovery of PAn-CP2-5 were also calculated based on the above tests. Shape fixity of 100% implies a perfect retention of the programmed strain after the external stress has been released, and reflects the efficacy of the first two steps of the shape memory process. Shape recovery of 100% implies perfect recovery of the permanent shape after the shape memory cycle. The films were subjected to 21 testing cycles (see FIGS. 5A and 5B). These films demonstrated excellent shape memory properties and repeatability. Shape fixity is about 95.6% to about 95.7%, and shape recovery is about 98.0% in each cycle.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A method for fabricating a shape memory polymer into a three-dimensional object, comprising:
   a) forming a solution comprising a poly(amic acid) intermediate, wherein the solution comprises a solvent, and a reaction product of an aromatic diamine monomer and a di-anhydride-containing monomer;
   b) treating the solution comprising the poly(amic acid) intermediate with a multi-functional crosslinking agent to thereby form a sol-gel comprising a crosslinked poly(amic acid);
   c) forming a film of crosslinked poly(amic acid) on a substrate to provide a laminated substrate;
   d) evaporating at least a portion of the solvent from the sol-gel comprising the crosslinked poly(amic acid) by heating the sol-gel comprising the crosslinked poly(amic acid) to a temperature in a range of about 50° C. to about 100° C. at a pressure less than about atmospheric pressure;
   e) forming the laminated substrate into a first configuration that is in a three-dimensional form
   f) curing the cross-linked poly(amic acid) to provide the shape memory polymer having a permanent shape corresponding to the first configuration, wherein the shape memory polymer comprises a crosslinked polyimide or a crosslinked poly(amide-imide) said curing comprises sequential heating said cross-linked poly(amic acid) to temperatures of about 150° C., about 175° C., about 200° C., about 250° C., and about 300° C.;
   g) chemically removing the substrate from the laminated substrate to provide the three-dimensional object comprising the shape memory polymer;
   h) heating the three-dimensional object to a first temperature that is above a triggering temperature;
   i) deforming the three-dimensional object to a second configuration that is different from the first configuration;
   j) lowering the three-dimensional object to a second temperature that is below the triggering temperature while the three-dimensional object is maintained in the second configuration; and
   k) heating the three-dimensional object in the second configuration to a third temperature that is above the triggering temperature to thereby induce the self-rearrangement of the three dimensional object from the second configuration to the first configuration.

2. The method of claim 1, wherein forming a film of crosslinked poly(amic acid) on a substrate comprises partially curing the crosslinked poly(amic acid) to form the crosslinked polyimide or the crosslinked poly(amide-imide).

3. The method of claim 1, wherein the substrate comprises a metal that dissolves in an aqueous acid solution.

4. The method of claim 3, wherein the metal comprises aluminum.

5. The method of claim 1, wherein the multi-functional crosslinking agent is a multi-functional amine crosslinking agent; and wherein the poly(amic acid) intermediate is an anhydride functionalized poly(amic acid) intermediate obtained by reacting a stoichiometric excess of the aromatic diamine monomer with the di-anhydride-containing monomer.

6. The method of claim 5, wherein the multi-functional amine crosslinking agent is defined by a general chemical formula (I):

wherein Z represents an anhydride functional group that is directly or indirectly bonded to Ar; Ar represents an aryl group that is directly bonded to W; and n is equal to 3 when W is P=O or N, or n is equal to 4 when W is Si or a carbon moiety.

7. The method of claim 6, wherein Ar is a phenyleneoxy group (—OPh-) that is para- or meta-substituted with respect to oxygen, and the agent is further defined by a general formula (II):

8. The method of claim 6, wherein Z and Ar in combination form a phthalic anhydride moiety that is directly bonded to W.

9. The method of claim 6, wherein Ar is a phenyleneoxy group (—OPh-) that is para- or meta-substituted with respect to oxygen, and wherein Z is a phthalic anhydride group that is connected to the phenyleneoxy group through an ether bond.

10. The method of claim 6, wherein W is P=O, wherein Ar is a phenyleneoxy group (—OPh-) that is para- or meta-substituted with respect to oxygen, and wherein the agent is further defined by a general formula (III):

Z—(—OPh-)$_3$-P=O.

11. The method of claim 10, wherein Z is a phthalic anhydride group that is connected to the phenyleneoxy group through an ether bond, and wherein the agent is further defined by a general formula (V):

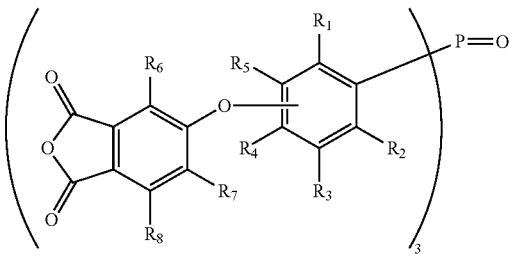

wherein R$_1$ through R$_8$ are independently selected from H or C$_1$-C$_4$ alkyl.

12. The method of claim 11, wherein the agent is selected from tris[3-(3,4-dicarboxyphenoxy)phenyl]phosphine oxide trianhydride or tris[4-(3,4-dicarboxyphenoxy)phenyl]phosphine oxide trianhydride.

13. The method of claim 6, wherein W is N, wherein Ar is a phenyleneoxy group (—OPh-) that is para- or meta-substituted with respect to oxygen, and wherein the agent is further defined by a general formula (VI):

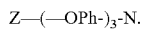

Z—(—OPh-)$_3$-N.

14. The method of claim 13, wherein Z is a phthalic anhydride group that is connected to the phenyleneoxy group through an ether bond, and wherein the agent is further defined by a general formula (VII):

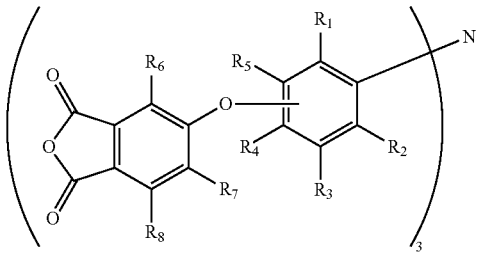

wherein R$_1$ through R$_8$ are independently selected from H or C$_1$-C$_4$ alkyl.

15. The method of claim 14, wherein the agent is selected from tris[3-(3,4-dicarboxyphenoxy)phenyl] amine trianhydride or tris[4-(3,4-dicarboxyphenoxy)phenyl]amine trianhydride.

16. The method of claim 6, wherein W is N, wherein Z and Ar in combination form a phthalic anhydride moiety that is directly bonded to N, and wherein the agent is further defined by a general formula (VIII):

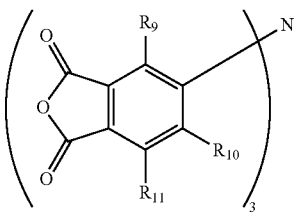

wherein R$_9$ to R$_{11}$ are independently selected from H or C$_1$-C$_4$ alkyl.

17. The method of claim 1, wherein the multi-functional crosslinking agent is a multi-functional amine crosslinking agent; and wherein the poly(amic acid) intermediate is an anhydride-terminated poly(amic acid) intermediate obtained by reacting a stoichiometric excess of the di-anhydride-containing monomer with the aromatic diamine monomer.

18. The method of claim 17, wherein the multi-functional amine crosslinking agent comprises a tri(oxybenzene-amine) crosslinker having the general formula (XII):

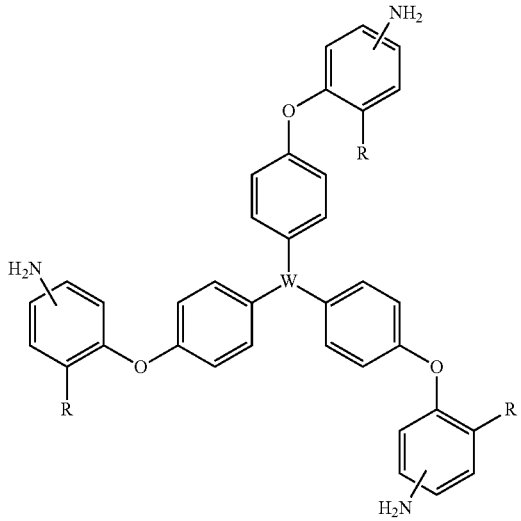

wherein W is selected from a group consisting of CH$_3$C, N, P=O, or BO$_3$; R is selected from a group consisting of H, F, Cl, CF$_3$, or CH$_3$; and the amine groups are located meta or para with respect to R.

* * * * *